Patented June 11, 1940

2,204,384

UNITED STATES PATENT OFFICE 2,204,384

ADHESIVE COMPOSITION AND METHOD OF PREPARING THE SAME

Henry M. Salisbury, Hawthorne, N. J.

No Drawing. Application April 24, 1937,
Serial No. 138,753

2 Claims. (Cl. 134—23.4)

The present invention relates to gum adhesives and to dry mixes therefor and to methods of making and using them, and the present invention relates more particularly to adhesives made from sucrose by converting the latter into invert syrup in the making of the adhesive.

Heretofore gum adhesives have been made by converting sucrose with acetic acid with the aid of water and heat, but this method has the disadvantages that (1) a suitable dry mixture for shipment and storage cannot be made, and (2) that it cannot be cooked and prepared in work rooms without the attendant strong odor of the acetic acid.

An object of the present invention is to provide a dry mixture for gum adhesives which can be shipped and then mixed and cooked with water on the job.

Another object of the present invention is to provide a dry mixture containing sucrose for making an invert syrup gum adhesive which is comparatively slow drying and which, when dry, is free from crystallization.

Another object of the present invention is to provide a dry mixture of sucrose with dextrine or starch which when prepared and applied dries comparatively slowly and which when dry is non-crystalline.

Other objects and advantages of the present invention will appear from the following description and examples of the invention and from the accompanying claims forming part hereof.

The present invention comprises making a dry mixture of sucrose and a non-volatile dry material which will convert the sucrose into invert syrup upon the addition of water and the application of heat.

The dry non-volatile materials for converting the sucrose into invert syrup and suitable for making dry mixes according to the present invention are non-volatile acids and non-volatile acid salts illustrative examples of which are citric acid, lactic acid, potassium acid tartrate, sodium and potassium acid phosphates and hemisodium and hemipotassium phosphate. Some of these materials have the additional advantage of being neutral as far as action on cellulose is concerned when the dry mix is made up into gum adhesive and applied to paper or cotton fabric.

In some cases in the practice of the present invention it is desirable to mix either dextrine or starch or mixtures of these with the sucrose for the purpose of controlling the consistency of the gum adhesive and for controlling the drying time thereof. When dark colored dextrine is used a dry, powder bleach can be mixed in when it is desired to bring the dextrine to a light color, as is the case with gum adhesives used for the back seams and windows of envelopes. Such a powder bleach can be sodium sulphite which has the additional advantage of being stable in the dry mix in hot weather.

Illustrative examples of dry mixes for making gum adhesives by mixing with water and the application of heat, according to the present invention, are as follows.

Example 1

Sucrose _____ parts by weight __ 48 to 50
Monocalcium acid phosphate ___ parts __ 1½
Sodium sulphite _____ do ____ 0.1
The remainder dextrine.

All in powdered form and thoroughly intermixed.

Example 2

Sucrose _____ parts by weight __ 45
Hemisodium phosphate (H₂NaPO₄) __ parts __ 1½
Sodium sulphite _____ do ____ 0.1
The remainder dextrine.

Example 3

Similar to Example 2 except that half of the dextrine is substituted by starch and the amount of sodium sulphite decreased accordingly.

Example 4

Sucrose _____ parts by weight __ 55
Citric acid _____ parts __ 1½
Sodium sulphite _____ do ____ 0.1
The remainder dextrine.

Example 5

Same as Example 4 except that all of the dextrine is replaced by starch and the sodium sulphite omitted.

Example 6

To a given quantity of sucrose, about three per cent of the weight thereof in mono-calcium acid phosphate are mixed together in powdered form.

The dry mixtures of the above examples can be shipped and stored for long periods of time without deterioration and when it is desired to use any of them it is cooked up with water as follows. About one hundred parts by weight of the dry mixture and from about 35 parts to about 60 parts of water are mixed together cold, and, when dextrine and bleach are present, left to stand for 15 to 20 minutes for the bleach to act on the dextrine. The water and dry mixture being thoroughly intermixed, they are heated to about 185° F. to 190° F. for about one hour to promote the conversion of the greater part of the sucrose to invert syrup, whereupon the mixture, which is now a gum adhesive is permitted to cool during which cooling substantially all of the remaining sucrose will be converted into invert syrup. When cold the gum is ready for use. The amount of water used is determined by the method of application or by the type of machine with which it is applied to the paper or other material upon which it is used, and glycerine can be mixed in by the user, when desired, to hold in the water as may be needed in dry weather.

The above examples are illustrative of the present invention and are not limiting with respect to the scope of the appended claims, and variations can be made without experimentation more than control tests for purity of materials, moisture content, variations due to variations in atmosphere temperature and humidity and so on such as are ordinarily conducted in well regulated plants, without departing from the spirit of the present invention.

Having thus described my invention, what I claim and desire to protect by Letters Patent is:

1. The method of making an adhesive which comprises mixing together sucrose about 55% to about 45%, material selected from the group consisting of starch and dextrine about 43½% to about 53½%, and an invert-convertor for said sucrose comprising material selected from the group consisting of non-volatile acids and acid salts about 1½%, adding water and heating to bring about conversion of the said sucrose to invert syrup.

2. A dry mixture adapted for use with water to make paste and liquid adhesives and comprising sucrose about 55% to about 45%, material selected from the group consisting of starch and dextrine about 43½% to about 53½%, and an invert-converting material selected from the group consisting of non-volatile acids and non-volatile acid salts about 1½%.

HENRY M. SALISBURY.